(12) United States Patent
Li

(10) Patent No.: US 11,751,505 B2
(45) Date of Patent: Sep. 12, 2023

(54) LAWNMOWER BLADE DISC AND MAINTENANCE POSITION THEREOF

(71) Applicant: Honda Motor Co., Ltd., Tokyo (JP)

(72) Inventor: Mengguang Li, Offenbach/Main (DE)

(73) Assignee: Honda Motor Co., Ltd., Tokyo (JP)

( * ) Notice: Subject to any disclaimer, the term of this patent is extended or adjusted under 35 U.S.C. 154(b) by 357 days.

(21) Appl. No.: 17/206,097

(22) Filed: Mar. 18, 2021

(65) Prior Publication Data

US 2022/0295701 A1 Sep. 22, 2022

(51) Int. Cl.
*A01D 34/74* (2006.01)
*A01D 101/00* (2006.01)
*A01D 34/00* (2006.01)
*A01D 34/78* (2006.01)

(52) U.S. Cl.
CPC ............ *A01D 34/74* (2013.01); *A01D 34/008* (2013.01); *A01D 34/78* (2013.01); *A01D 2101/00* (2013.01)

(58) Field of Classification Search
CPC ...... A01D 34/74; A01D 34/008; A01D 34/78; A01D 2101/00
USPC .......................................................... 56/17.1
See application file for complete search history.

(56) References Cited

U.S. PATENT DOCUMENTS

2021/0037705 A1   2/2021   Watanabe et al.

FOREIGN PATENT DOCUMENTS

| CN | 205284170 U | * | 6/2016 |
|---|---|---|---|
| EP | 3167703 | | 5/2017 |
| JP | 2016185099 | | 10/2016 |
| JP | 2021027809 | | 2/2021 |
| JP | 2021027810 | | 2/2021 |

* cited by examiner

*Primary Examiner* — Mahmoud Gimie
(74) *Attorney, Agent, or Firm* — JCIPRNET

(57) ABSTRACT

A work vehicle is provided. The work vehicle includes a housing, a first motor, a working part, a position adjustment mechanism and an abutment part. The first motor has an output shaft. The working part includes a member coupled to the output shaft. The position adjustment mechanism includes a second motor, and is configured to change a position of the working part with respect to the housing. The abutment part includes a surface, and is disposed on the housing. The position adjustment mechanism is configured to change the position of the working part such that the abutment part abuts the working part when the working part arrives at a position closest to the housing.

18 Claims, 11 Drawing Sheets

LAWNMOWER BLADE DISC AND MAINTENANCE POSITION THEREOF

BACKGROUND

Technical Field

The disclosure relates to a lawnmower blade disc and a maintenance position of the lawnmower blade disc.

Description of Related Art

A robotic lawnmower includes a plurality of cutting blades for cutting grass. In the conventional robotic lawnmower, the cutting blades can move freely when the cutting blades are being changed during maintenance or when the robotic lawnmower is not in use. The cutting blades moving freely may cause difficulty in replacing the blade to a user. In addition, the cutting blades may be damaged in an idle state of the robotic lawnmower due to the cutting blades moving freely. Therefore, a solution is needed for a robotic lawnmower having a blade disc with a maintenance position so that the blades can be kept in a stable position when the blades are being changed or when the robotic lawnmower is not mowing the grass.

SUMMARY

According to an embodiment of the disclosure, a work vehicle is provided. The work vehicle includes a housing, a first motor, a working part, a position adjustment mechanism and an abutment part. The first motor has an output shaft. The working part includes a member coupled to the output shaft. The position adjustment mechanism includes a second motor, and is configured to change a position of the working part with respect to the housing. The abutment part includes a surface, and is disposed on the housing. The position adjustment mechanism is configured to change the position of the working part such that the abutment part abuts the working part when the working part arrives at a position closest to the housing.

According to an embodiment of the disclosure, the work vehicle is an autonomous work vehicle including a processor, and the processor is configured to abut the working part with the abutment part after work is completed.

According to an embodiment of the disclosure, the work vehicle is a lawnmower, and the member coupled to the output shaft is a blade disc having a cutting blade, and the blade disc abuts with the abutment part.

According to an embodiment of the disclosure, the cutting blade is disposed at a one side of the housing, and the position adjustment mechanism is an adjustment mechanism for adjusting a height position of the working part.

According to an embodiment of the disclosure, the abutment part is disposed radially of the output shaft, and the abutment part is disposed only at one portion of an imaginary perimeter radial to the output shaft.

According to an embodiment of the disclosure, the abutment part is disposed around an imaginary perimeter radial to the output shaft.

According to an embodiment of the disclosure, the abutment part is disposed between an axis of the blade disc and the cutting blade disposed at an outer periphery of the blade disc.

According to an embodiment of the disclosure, a surface of the abutment part abutting the blade disc is a flat surface, and a surface of the blade disc abutting the abutment part is a flat surface.

According to an embodiment of the disclosure, a surface of the abutment part includes a protrusion, and a surface of the blade disc includes a recess adapted to fit with the protrusion.

According to an embodiment of the disclosure, a surface of the blade disc includes a protrusion, and a surface of the abutment part includes a recess adapted to with the protrusion.

According to an embodiment of the disclosure, an interval separating a plurality of the protrusions is greater than an interval separating a plurality of the recesses.

According to an embodiment of the disclosure, the protrusion includes a tilted surface tilted with respect to a thickness direction of the blade disc.

According to an embodiment of the disclosure, a surface of the abutment part abutting the blade disc includes a protrusion, and a surface of the blade disc abutting the abutment part includes a protrusion.

According to an embodiment of the disclosure, the abutment part is a ring disposed around an imaginary perimeter radial to the output shaft.

According to an embodiment of the disclosure, the abutment part is disposed only at three portions of an imaginary perimeter radial to the output shaft.

According to an embodiment of the disclosure, the abutment part comprises a spring.

DESCRIPTION OF THE EMBODIMENTS

Figure 1:
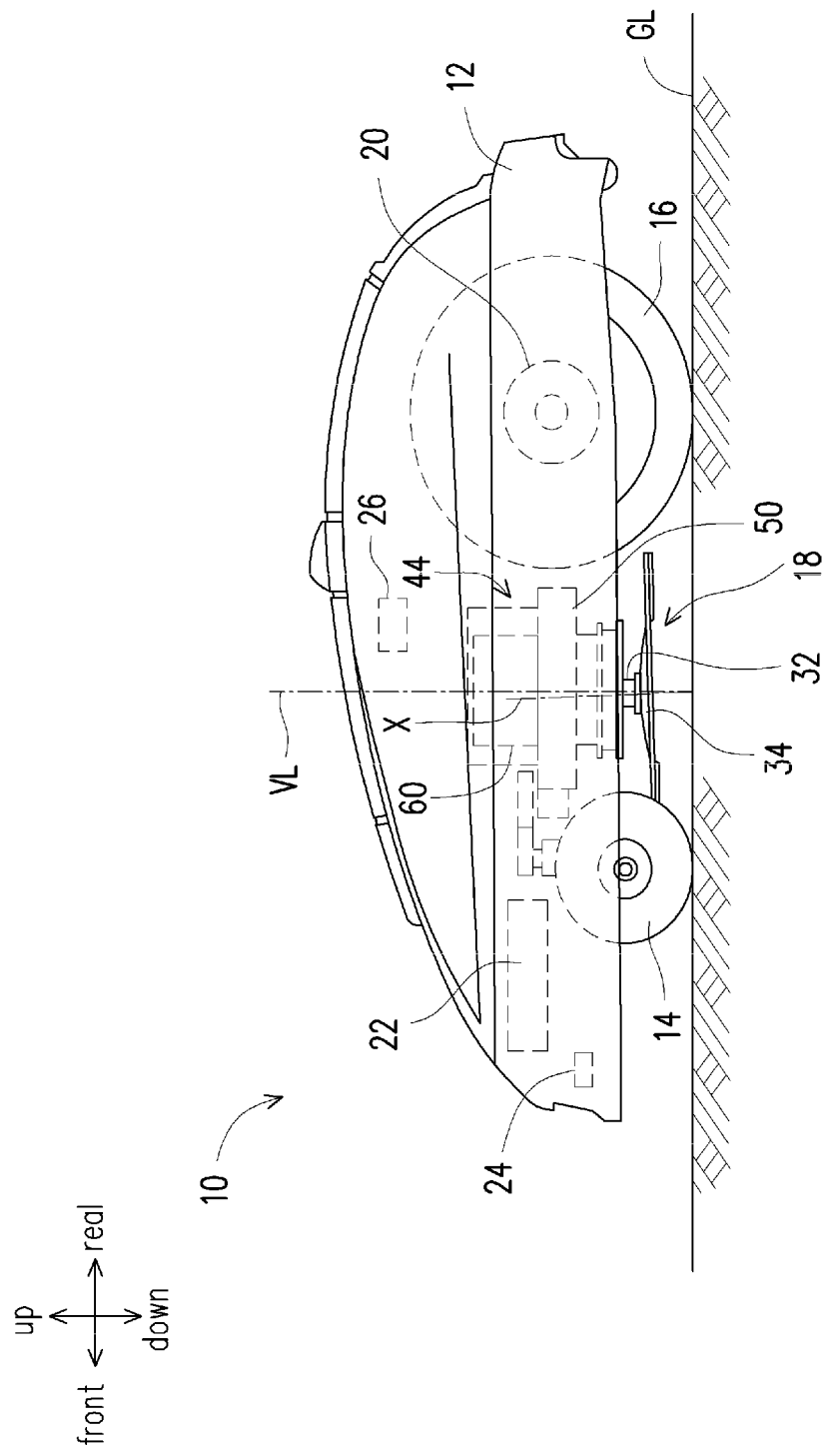
FIG. 1 is a schematic diagram illustrating a lawnmower according to an embodiment of the disclosure.

According to an exemplary embodiment of the disclosure, a lawnmower is provided. FIG. 1 is a schematic diagram illustrating a lawnmower in a working state according to an embodiment of the disclosure. Referring to FIG. 1, a lawnmower 10 is an example of a work vehicle of the present disclosure.

The lawnmower 10 is an autonomous driving lawnmower (often referred to as robotic lawnmower) that can autonomously travel to mow the grass. The lawnmower 10 includes a housing 12, a pair of front wheels 14 and a pair of rear wheels 16 provided on the housing 12. The lawnmower 10 further includes a working part 18 provided between the front wheels 14 and the rear wheels 16. The working part 18 is disposed at a one side of the housing 12. The rear wheels 16 are individually driven by a pair of travel motors 20, respectively.

The housing 12 is provided with a battery 22 that supplies power to the travel motors 20 and other electric devices, a detection sensor group 24 which may include an obstacle detection sensor (such as a contact sensor), an angular velocity sensor, an acceleration sensor, etc., and a control unit 26 that controls the driving of the travel motors 20 and the working part 18 according to the detection signals of the detection sensor group 24.

The lawnmower 10 can travel straight forward and rearward by driving the travel motors 20 in the forward and rearward direction, respectively, at a same speed, and can turn right and left by driving the travel motors 20 at different speeds in corresponding manners.

The working part 18 is supported by the housing 12 via a support member 60 (which will be described hereinafter) in a vertically adjustable manner so that the cutting grass height can be changed.

Figure 2:
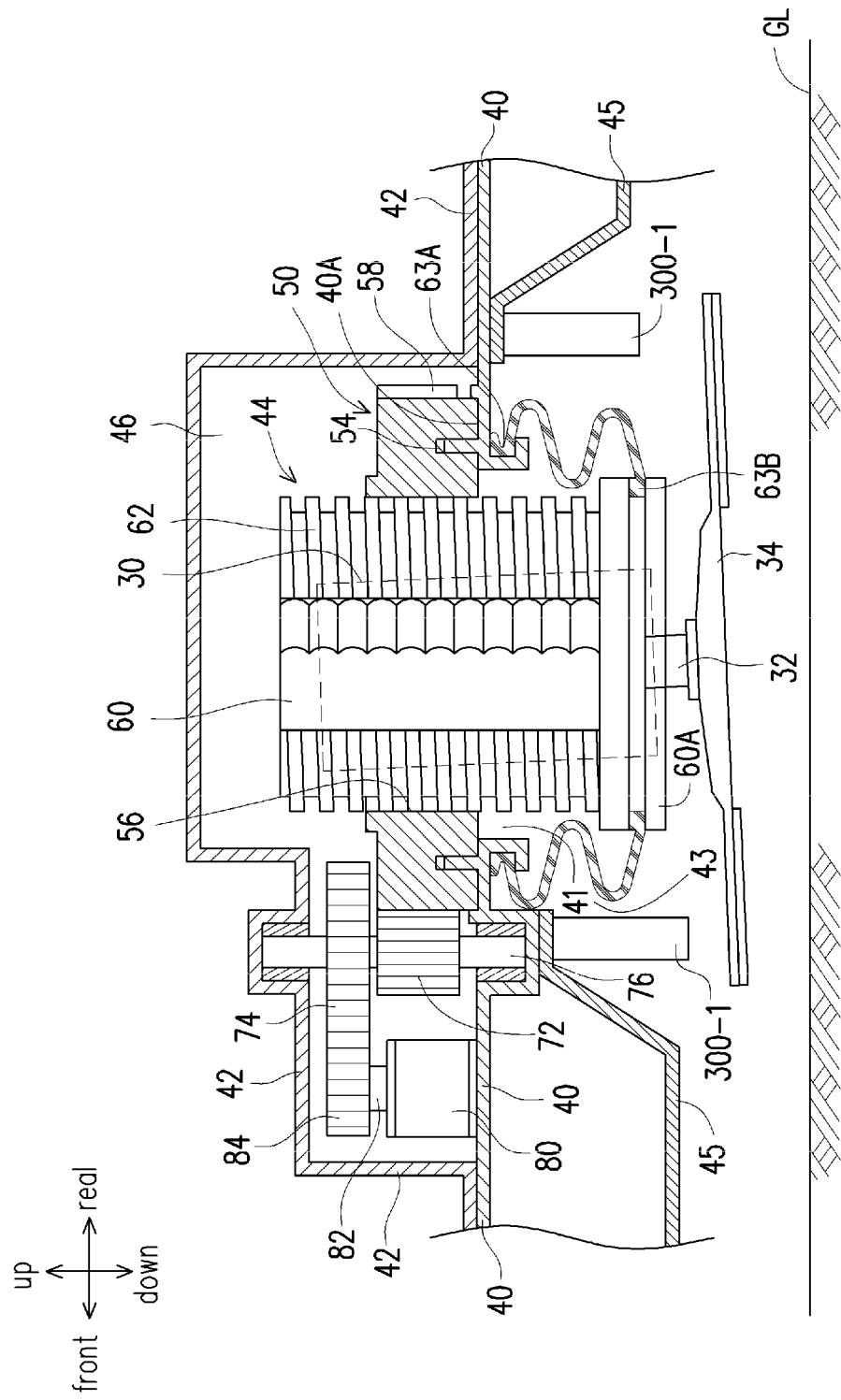
FIG. 2 is a sectional view diagram of a working part of the lawnmower in a working state according to an embodiment of the disclosure.

FIG. 2 is a sectional view diagram of a working part of the lawnmower in a working state according to an embodiment of the disclosure. The working state refers to a configuration of the lawnmower which is intended to cut grass. Referring to FIG. 1 and FIG. 2, the working part 18 includes a mowing motor (electric motor) 30 having an output shaft 32 extending downward, and a blade disc 34 attached to the lower end of the output shaft 32 of the mowing motor 30. The blade disc 34 is rotatably driven by the mowing motor 30 to mow the lawn. The mowing motor 30 is an example of a first motor of the disclosure. The blade disc 34 is an example of a member coupled to the output shaft 32.

The rotational axis of the output shaft 32 of the mowing motor 30, or in other words, the center axis X of the blade disc 34 extends in a vertical direction of the housing 12 (the vertical line VL which is orthogonal to the ground surface plane GL). More specifically, the center axis X is slightly tilted with respect to the vertical line VL, such that an upper end of the center axis X is tilted towards the front tires 14 with respect to the vertical line VL, and a lower end of the center axis X is tilted towards the rear tires 16 with respect to the vertical line VL. In other words, the center axis X displaces rearward as the center axis X approaches the lower end thereof. Thereby, the freshly cut grass is prevented from being rubbed by the rear part of the blade disc 34 as the mower 10 travels forward.

The housing 12 includes a lower casing 45, a middle casing 40, and an upper casing 42 which are jointly fastened to a frame (not shown) that forms part of the housing 12 by using a plurality of bolts (now shown). An abutment part 300-1 is disposed on the housing 12. More specifically, the abutment part 300-1 is fixed to the lower casing 45 of the housing 12. In the present embodiment, the abutment part 300-1 is fixed to the lower casing 45, however the disclosure is not limited thereto. In another embodiment of the disclosure, the abutment part 300-1 may be fixed to the middle casing 40. In other embodiments, the abutment part 300-1 may be fixed to other components of the lawnmower 10, such that the abutment part 300-1 may be fixed to the housing 12 indirectly. In the working state of the lawnmower 10, the abutment part 300-1 does not abut the blade disc 34. In other words, in the working state of the lawnmower 10, the abutment part 300-1 does not contact the blade disc 34.

It should be noted, in the cross-section shown in FIG. 2, the abutment part 300-1 is disposed on a flat surface of the lower casing 45. However, the disclosure is not limited thereto. In other embodiments of the disclosure, the abutment part 300-1 may be disposed on a slanted surface, a curved surface, an uneven surface, or the like and the type of surface which the abutment part 300-1 is disposed on is not intended to limit the disclosure. Furthermore, a thickness direction of the abutment part 300-1 may be parallel with an axial direction of the output shaft 32 or parallel with an axial direction of the cylindrical support member, or, the thickness direction of the abutment part 300-1 may be in another direction, however the thickness direction of the abutment part 300-1 is not intended to limit the disclosure. A material of the abutment part 300-1 may be a metal material, for example, steel, aluminum, bronze and the like. In other embodiments, a material of the abutment part 300-1 may be a plastic material, for example, ABS, PVC and the like. However, a material of the abutment part 300-1 may be other materials and is not intended to limit the disclosure.

The middle casing 40 and the upper casing 42 jointly define a housing chamber 46 that accommodates a position adjustment mechanism 44. The position adjustment mechanism 44 includes an annular ring member 50 having a female screw thread 56 formed on the inner circumferential surface thereof in a coaxial relationship to the cylindrical support member 60. The cylindrical support member 60 has a male screw thread 62 which is formed on the outer surface thereof, and is threaded into the female screw thread 56 of the annular ring member 50.

The annular ring member 50 has an annular flat lower surface 50A which slidably rests circumferentially upon a flat upper surface 40A of the middle casing 40. The middle casing 40 is provided with a central opening 41 through which the cylindrical support member 60 extends. The lower casing 45 is provided with a central opening 43 through which the cylindrical support member 60 extends. The lower surface 50A of the annular ring member 50 is formed with an annular recess 54 in a coaxial relationship to the female screw thread 56. The upper surface 40A of the middle casing 40 is provided with an annular rib 52 which projects upward and extends circumferentially, and is received in the annular recess 54 in a complementary and mutually slidable manner.

The outer circumferential surface of the annular ring member 50 is formed with external gear teeth 58. The female screw thread 56 is not required to extend over the entire circumference, but may be partly omitted along the circumferential direction as in an interrupted screw.

The support member 60 is prevented from rotating around the center axis thereof. A linear guide mechanism (not shown) or a configuration such as described in US patent publication number 2021/0037705 may prevent the support member 60 from rotating around the center axis thereof. As a result, the support member 60 is held in place (or is prevented from rotating around the axis thereof) against the upper casing 42. Therefore, when the ring member 50 is rotated around the axis thereof (which coincides with the axis of the support member 60), the support member 60 is actuated in the vertical direction (namely the up-down direction).

The lower end part 60A of the support member 60 protrudes downward from the opening 41 formed in the middle casing 40, and from the opening 43 formed in the lower casing 45. The mowing motor 30 is housed in the hollow interior of the support member 60, and is fixedly secured to the support member 60. The output shaft 32 of the mowing motor 30 protrudes downward from the lower end part 60A of the support member 60, and the blade disc 34 is attached to the lower end of the output shaft 32. As a result, the height of the blade disc 34 from the ground can be changed so as to change the mowing height by vertically displacing the support member 60.

A rubber seal member 63 in the form of a cylindrical bellows is provided between the middle casing 40 and a lower end part 60A of the support member 60. The seal member 63 includes an upper end 63A that is attached to the middle casing 40 on the periphery of the opening 41 and a lower end 63B that is attached to the lower end part 60A of the support member 60 to prevent mowed grass, rainwater, etc. from entering the housing chamber 46. In particular, the screw thread engagement between the female screw thread 56 and the male screw thread 62 is protected from the intrusion of foreign matters.

A rotational movement of the ring member 50 is guided using the engagement between the annular recess 54 of the ring member 50 and the annular rib 52 of the middle casing 40. The support member 60 is engaged by the ring member 50 via the threading of the female screw thread 56 of the ring member 50 and the male screw thread 62 of the support member 60.

The drive mechanism of the ring member 50 (or for the position adjustment mechanism 44) is described in the following. The middle casing 40 supports a pinion 72 within the housing chamber 46 so as to be freely rotatable around a vertical axial line. The pinion 72 engages external gear teeth 58 formed on the outer periphery of the ring member 50 in a power transmitting relationship. A driven gear 74 is coaxially and integrally connected to the upper end of the pinion 72. The pinion 72 and the driven gear 74 are jointly supported by a pivot shaft 76 which is rotatably supported by the middle casing 40 and the upper casing 42 at the lower end and the upper end of the pivot shaft 76, respectively.

The position adjustment mechanism 44 further includes a stepping motor 80 for height adjustment of the support member 60 and the blade disc 34. The stepping motor 80 is attached to the middle casing 40. The stepping motor 80 is disposed in the housing chamber 46, and has an output shaft 82 projecting vertically upward therefrom. A drive gear 84 is attached to the output shaft 82, and meshes with the driven gear 74. As a result, the pinion 72 is rotatably driven by the stepping motor 80. The stepping motor 80 is an example of a second motor of the disclosure.

Thus, according to the present disclosure, the ring member 50 can be rotated by the stepping motor 80, and the resulting angular movement of the ring member 50 causes a corresponding vertical movement of the support member 60 owing to the screw thread engagement between the female screw thread 56 of the ring member 50 and the male screw thread 62 of the support member 60. Therefore, the stepping motor 80 allows the support member 60 to be adjusted to a plurality of discrete vertical positions. Consequently, it may be understood that the position adjustment mechanism (the stepping motor 80) is configured to change the position of the working part 18 (including the blade disc 34).

Figure 3:
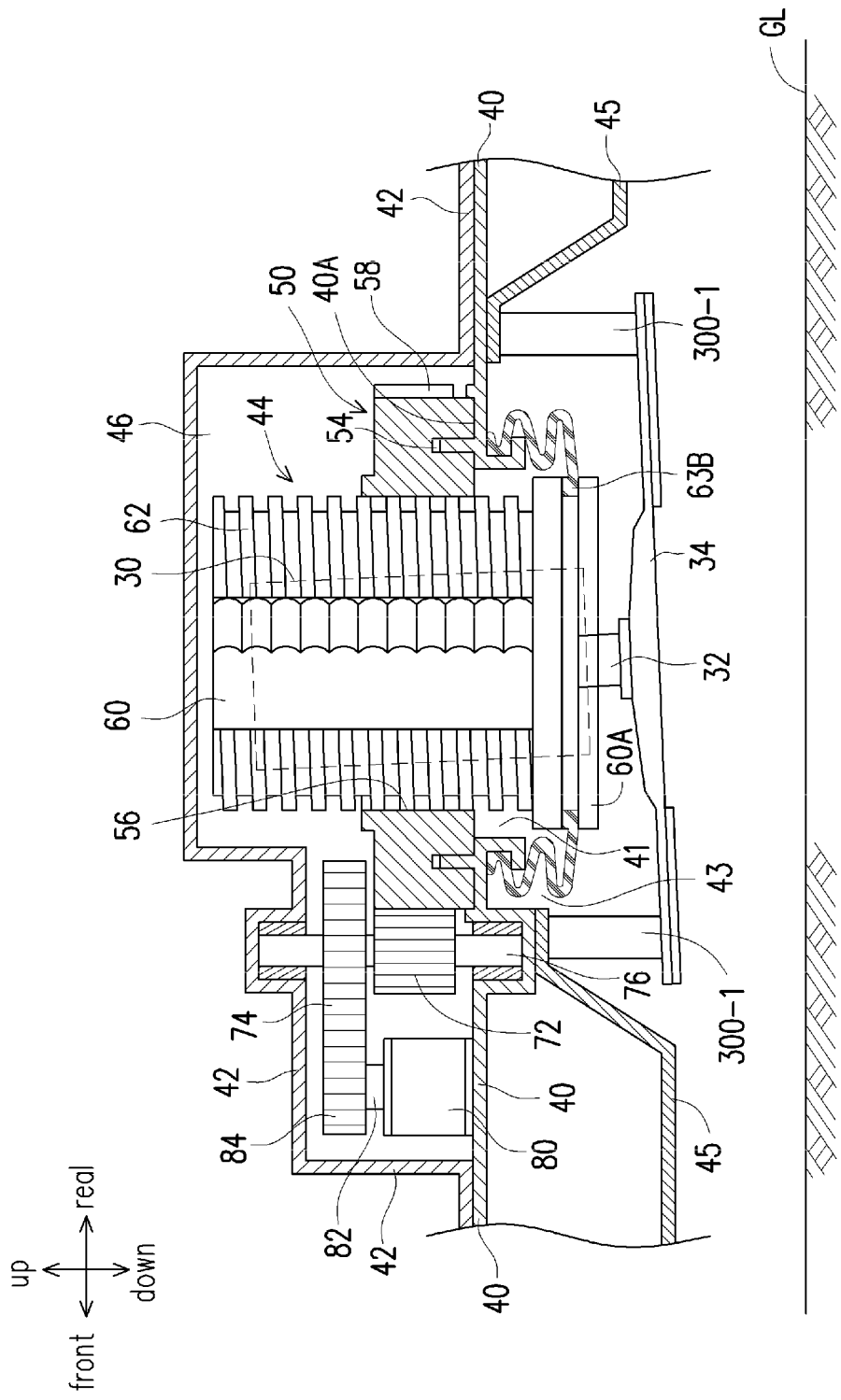
FIG. 3 is a sectional view diagram of a working part of the lawnmower in a maintenance state according to an embodiment of the disclosure.

FIG. 3 is a sectional view diagram of a working part of the lawnmower in a maintenance state according to an embodiment of the disclosure. The maintenance state refers to a configuration of the lawnmower 10 which is intended to undergo maintenance, such as replacing a cutting blade 35 of the blade disc 34. In other words, the maintenance state is a configuration of the lawnmower 10 which is not intended to cut grass.

Referring to FIG. 3, the position of the blade disc 34 is changed from the working state shown in FIG. 2 to the maintenance state shown in FIG. 3. More specifically, as seen in FIG. 3, the position adjustment mechanism 44 moved the position of the blade disc 34 upward in the vertical direction to a position where the blade disc 34 abuts the abutment part 300-1. In more detail, the blade disc 34 includes a plurality of the cutting blades 35. In a maintenance state of the lawnmower 10, the position adjustment mechanism (the stepping motor 80) is configured to change the position of the working part 18 (the working part 18 including the blade disc 34) such that the abutment part 300-1 abuts the working part 18 when the working part 18 is at a position closest to the housing. In this way, the working part 18 may be fixed with respect to the housing 12 of the lawnmower 10 by the position adjustment mechanism 44. In the present embodiment, the working part 18 is fixed with the housing 12 due to friction and/or pressure generated by the abutment. In this way, when changing the cutting blade 35 during maintenance, since the blade disc 34 is fixed with respect to the housing 12, therefore a process of changing out the cutting blade 35 may be performed with ease.

As mentioned above, the maintenance state is a configuration of the lawnmower 10 which is not intended to cut grass. That is to say, the lawnmower 10 further includes a processor (not shown), and the processor is configured to abut the working part 18 with the abutment part 300-1 after work is completed (i.e. after mowing of the lawn is completed). More specifically, the processor is configured to abut the blade disc 34 with the abutment part 300-1 after work is completed. In this way, when the lawnmower 10 is not working (not cutting grass), the working part 18 may be fixed to the housing 12 such that damage to the working part 18 caused by the working part 18 rotating/moving during traveling in the non-working state or in the standby state of the lawnmower 10 is prevented.

In the present embodiment of the disclosure, the cutting blade 35 is disposed at a one side of the housing 12, and the position adjustment mechanism 44 is an adjustment mechanism for adjusting a height position of the working part 18. More specifically, the cutting blade 35 is disposed at the bottom side of the housing 12. In this way, a conventional height adjustment mechanism for setting a cut length of the grass may be used to abut the abutment part 300-1 with the blade disc 34. That is to say, the same mechanism for adjusting a length of the cut grass may be used for a mechanism of fixing the blade disc to the housing 12 for maintenance. In this way, an additional mechanism (motor, etc.) for abutting the abutment part 300-1 with the blade disc 34 is not needed.

It should be noted, in the present embodiment, a contact surface of the abutment part 300-1 is angled with respect to the horizontal direction of the lawnmower 10 to be substantially parallel to a contact surface of the blade disc 34. The specific angle of the contact surface of the abutment part 300-1 and the contact surface of the blade disc 34 may be configured according to requirements and is not intended to limit the disclosure.

Figure 4A:
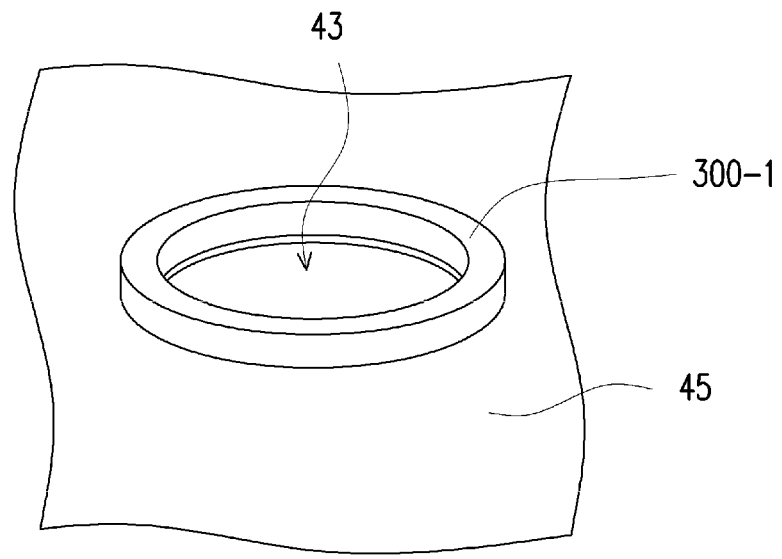
FIG. 4A is a schematic diagram illustrating a perspective view of an abutment part according to a first embodiment of the disclosure.
Figure 4B:
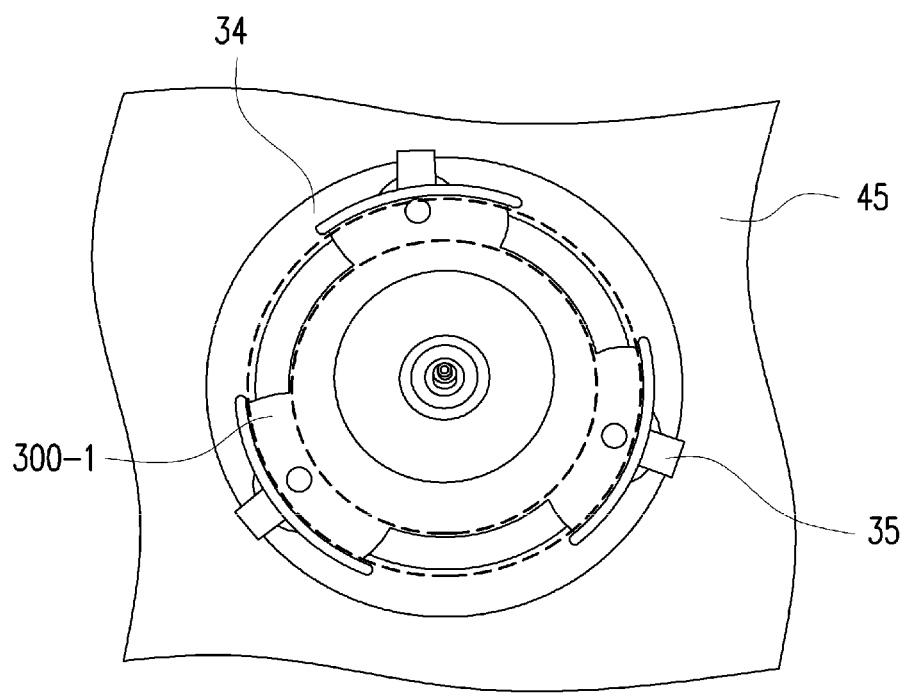
FIG. 4B is a schematic diagram illustrating a bottom view of a working part of the lawnmower having the abutment part according to the first embodiment of the disclosure.

FIG. 4A is a schematic diagram illustrating a perspective view of an abutment part according to a first embodiment of the disclosure. FIG. 4B is a schematic diagram illustrating a bottom view of a working part of the lawnmower having the abutment part according to the first embodiment of the disclosure. In FIG. 4A, the illustration of the blade disc 34, the output shaft 32, the support member 60 and the like are omitted. In FIG. 4B, an outline of the abutment part 300-1 is shown in dashed lines since the abutment part cannot be seen due to the abutment part 300-1 is disposed between the lower casing 45 and the blade disc 34.

Referring to FIG. 4A and FIG. 4B, the abutment part 300-1 is disposed between the blade disc 34 and the lower casing 45. In the first embodiment, the abutment part 300-1 is a ring shaped substrate disposed around an imaginary perimeter radial to the output shaft 32, and is fixed to the lower casing 45. In other words, the abutment part 300-1 has a circular shape with a hole through the middle thereof. That is to say, the abutment part 300-1 takes the shape of a hollow cylinder. The abutment part 300-1 is disposed radially of the output shaft 32, and the abutment part 300-1 is disposed around an imaginary perimeter radial to the output shaft 32. More specifically, the abutment part 300-1 is disposed between an axis of the blade disc 34 and the cutting blade 35 disposed at an outer periphery of the blade disc 34. That is to say, the abutment part 300-1 is disposed between an axis of the output shaft 32 and the cutting blade 35 disposed at an outer periphery of the blade disc 34. In the maintenance state of the lawnmower 10, the blade disc 34 is abutted with the ring shaped abutment part 300-1. In this way, the friction generated between the abutment part 300-1 and the blade disc 34 may be increased relatively, compared to when the abutment part 300-1 is disposed to abut an outer periphery of the blade disc 34. In this way, a quantity of the abutment part(s) or a contacting area of the abutment part may be reduced. A pressure and friction generated between the abutment part 300-1 and the blade disc 34 prevents the blade disc 34 from rotating around the output shaft 32. By preventing the blade disc 34 from rotating around the output shaft 32, a maintenance position of the blade disc 34 is provided so that the cutting blade 35 may be kept in a stable position when the cutting blade 35 is being changed by the user or when the lawnmower 10 is not in use (such as when the lawnmower 10 is traveling without cutting grass). In the present embodiment, since a contacting surface between the ring shaped abutment part 300-1 and the blade disc 34 is relatively large, a grip (or friction) between the abutment part 300-1 and the blade disc 34 is increased such that the blade disc 34 may be firmly fixed with respect to the housing 12.

Figure 5A:
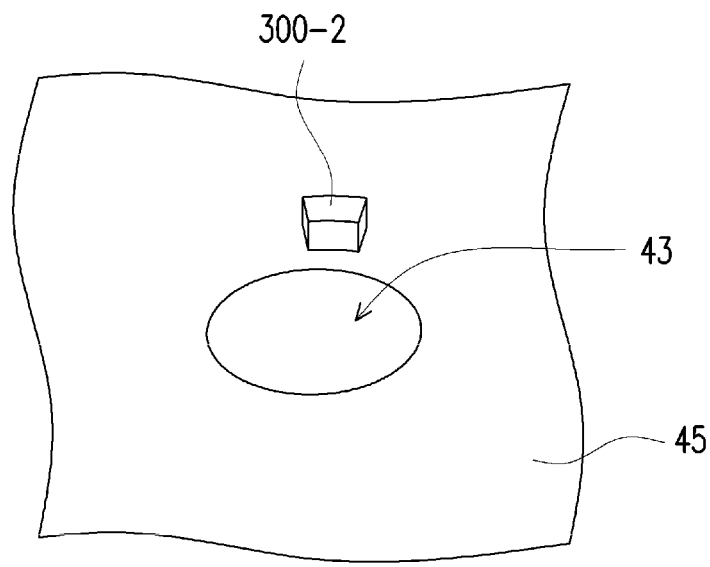
FIG. 5A is a schematic diagram illustrating a perspective view of an abutment part according to a second embodiment of the disclosure.
Figure 5B:
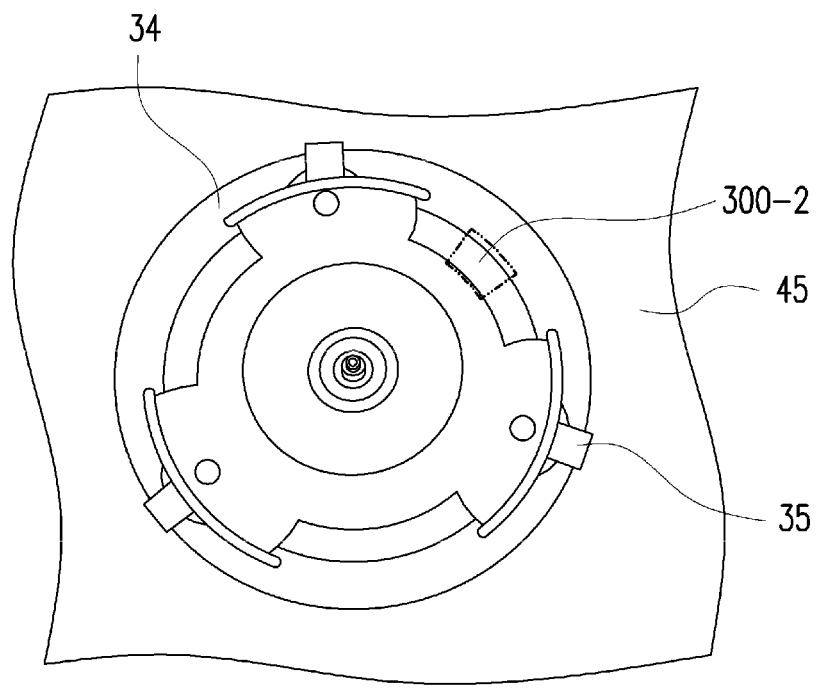
FIG. 5B is a schematic diagram illustrating a bottom view of a working part of the lawnmower having the abutment part according to the second embodiment of the disclosure.

FIG. 5A is a schematic diagram illustrating a perspective view of an abutment part according to a second embodiment of the disclosure. FIG. 5B is a schematic diagram illustrating a bottom view of a working part of the lawnmower having the abutment part according to the second embodiment of the disclosure. In FIG. 5A, the illustration of the blade disc 34, the output shaft 32, the support member 60 and the like are omitted. In FIG. 5B, an outline of the abutment part 300-2 is shown in dashed lines since the abutment part cannot be seen due to the abutment part 300-2 is disposed between the lower casing 45 and the blade disc 34.

Referring to FIG. 5A and FIG. 5B, the abutment part 300-2 is disposed between the blade disc 34 and the lower casing 45. In the second embodiment, the abutment part 300-2 is disposed radially of the output shaft 32. However, the abutment part 300-2 is disposed only at one portion of an imaginary perimeter radial to the output shaft 32. That is to say, the abutment part 300-2 of the second embodiment is a single structure and is not a ring shape. More specifically, the abutment part 300-2 is disposed between an axis of the blade disc 34 and the cutting blade 35 disposed at an outer periphery of the blade disc 34. That is to say, the abutment part 300-2 is disposed between an axis of the output shaft 32 and the cutting blade 35 disposed at an outer periphery of the blade disc 34. In the maintenance state of the lawnmower 10, the blade disc 34 is abutted with the abutment part 300-2. In this way, the friction between the abutment part 300-2 and the blade disc 34 may be increased relatively compared to when the abutment part 300-2 is disposed to abut an outer periphery of the blade disc 34, and a quantity of the abutment part or a contacting area of the abutment part may be reduced. A pressure and friction generated between the abutment part 300-2 and the blade disc 34 prevents the blade disc 34 from rotating around the output shaft 32. By preventing the blade disc 34 from rotating around the output shaft 32, a maintenance position of the blade disc 34 is provided so that the cutting blade 35 may be kept in a stable position when the cutting blade 35 is being changed by the user or when the lawnmower 10 is not in use (such as when the lawnmower 10 is traveling without cutting grass). In the present embodiment, since a size dimension of the abutment part 300-2 is relatively small, a grip between the abutment part 300-2 and the blade disc 34 may be provided even when there is limited amount of space for disposing the abutment part 300-2.

Figure 6A:
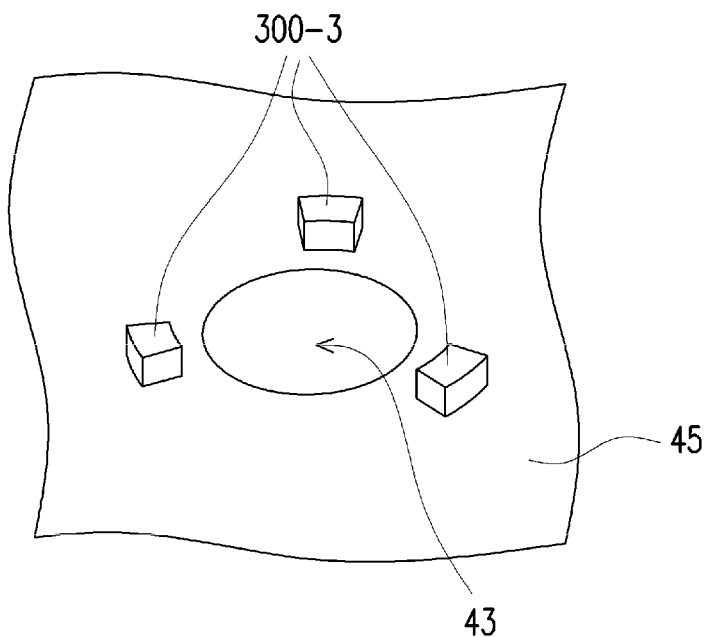
FIG. 6A is a schematic diagram illustrating a perspective view of an abutment part according to a third embodiment of the disclosure.
Figure 6B:
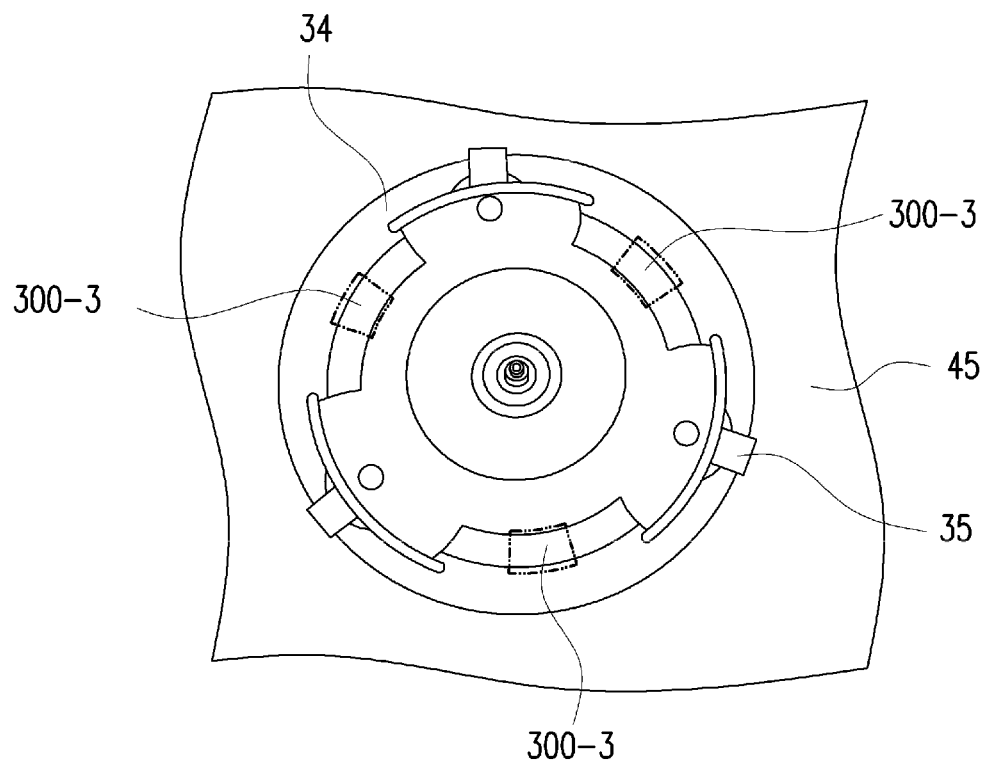
FIG. 6B is a schematic diagram illustrating a bottom view of a working part of the lawnmower which has the abutment part according to the third embodiment of the disclosure.

FIG. 6A is a schematic diagram illustrating a perspective view of an abutment part according to a third embodiment of the disclosure. FIG. 6B is a schematic diagram illustrating a bottom view of a working part of the lawnmower which has the abutment part according to the third embodiment of the disclosure. In FIG. 6A, the illustration of the blade disc 34, the output shaft 32, the support member 60 and the like are omitted. In FIG. 6B, an outline of the abutment part 300-3 is shown in dashed lines since the abutment part cannot be seen due to the abutment part 300-3 is disposed between the lower casing 45 and the blade disc 34.

Referring to FIG. 6A and FIG. 6B, the abutment part 300-3 is disposed between the blade disc 34 and the lower casing 45. In the third embodiment, the abutment part 300-3 is disposed radially of the output shaft 32. However, the abutment part 300-3 is disposed at a plurality of portions of an imaginary perimeter radial to the output shaft 32. That is to say, the abutment part 300-3 of the third embodiment includes three separate abutment parts 300-3. More specifically, the plurality of abutment parts 300-3 are disposed between an axis of the blade disc 34 and the cutting blade 35 disposed at an outer periphery of the blade disc 34. That is to say, the plurality of abutment parts 300-3 are disposed between an axis of the output shaft 32 and the cutting blade 35 disposed at an outer periphery of the blade disc 34. In the maintenance state of the lawnmower 10, the blade disc 34 is abutted with the plurality of abutment parts 300-3. In this way, the friction between the plurality of abutment parts 300-3 and the blade disc 34 may be increased relatively compared to when the abutment parts 300-3 are disposed to abut an outer periphery of the blade disc 34, and a quantity of the abutment parts or a contacting area of the abutments part may be reduced. A pressure and friction generated between the abutment parts 300-3 and the blade disc 34 prevents the blade disc 34 from rotating around the output shaft 32. By preventing the blade disc 34 from rotating around the output shaft 32, a maintenance position of the blade disc 34 is provided so that the cutting blade 35 may be kept in a stable position when the cutting blade 35 is being changed by the user or when the lawnmower 10 is not in use (such as when the lawnmower 10 is traveling without cutting grass).

Figure 7:
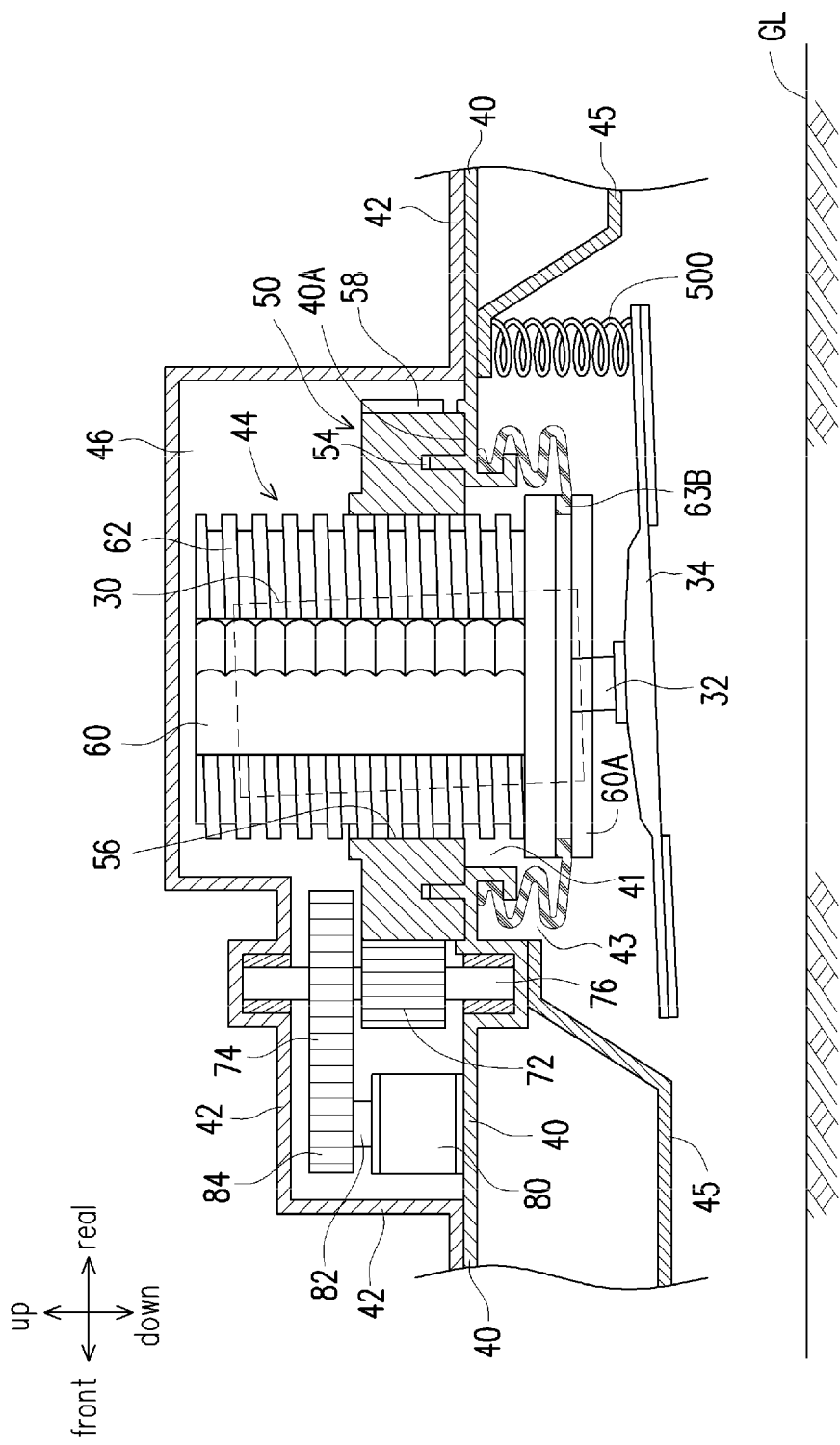
FIG. 7 is a sectional view diagram of a working part of the lawnmower in a maintenance state having an abutment part according to a fourth embodiment of the disclosure.

FIG. 7 is a sectional view diagram of a working part of the lawnmower in a maintenance state having an abutment part according to a fourth embodiment of the disclosure. Referring to FIG. 7, the abutment part, may be a spring 500. The spring 500 may provide elasticity as an abutment part. Although the blade disc 34 in the present embodiment has been schematically illustrated as having a substantially flat contact surface abutting with the spring 500 (abutment part), in other embodiments, the contact surface of the blade disc 34 may be an uneven surface or have dents and protrusions. In this way, the spring 500 may easily accommodate the uneven contact surface of the blade disc 34.

Figure 8:
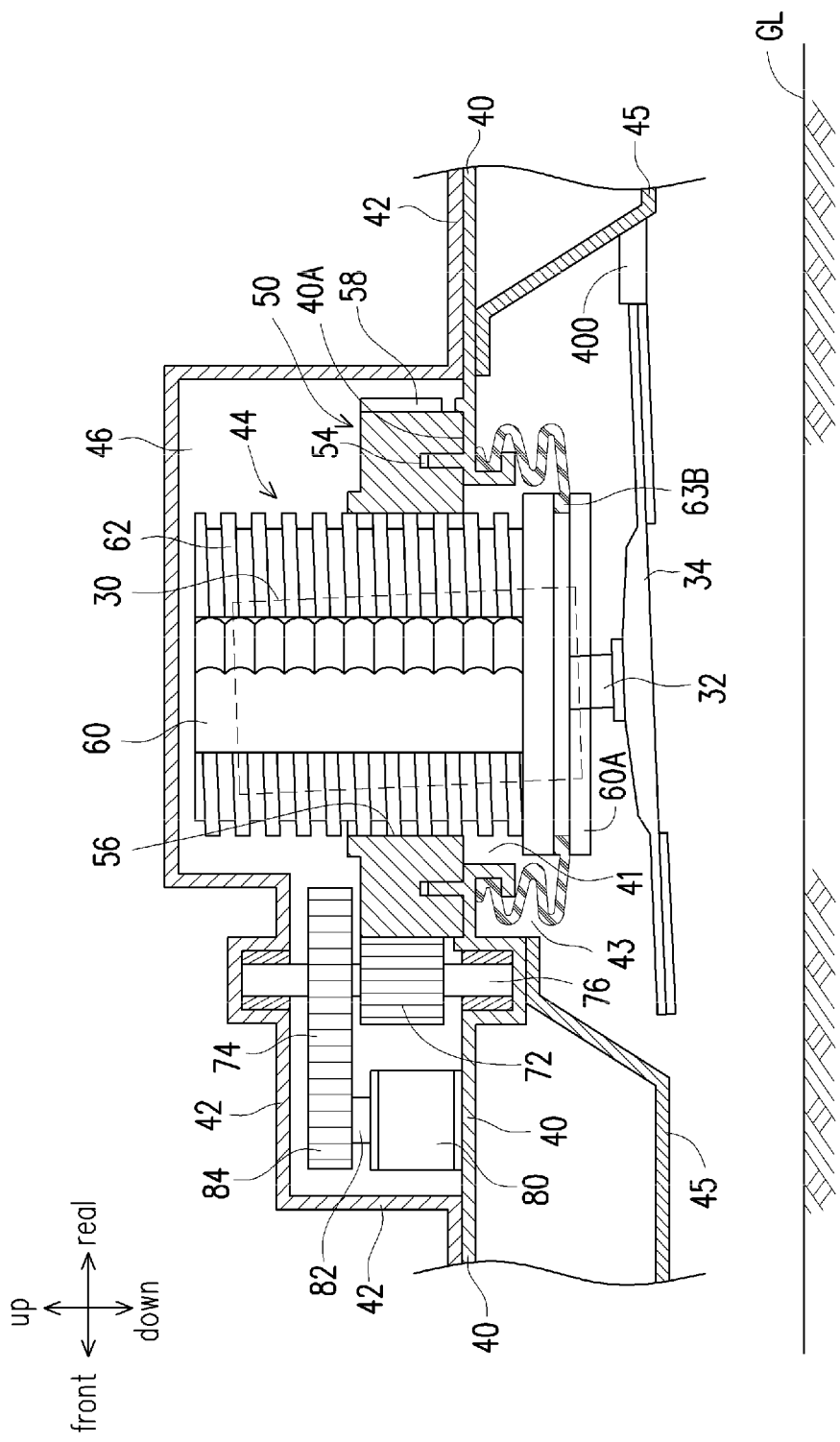
FIG. 8 is a sectional view diagram of a working part of the lawnmower in a maintenance state having an abutment part according to a fifth embodiment of the disclosure.

FIG. 8 is a sectional view diagram of a working part of the lawnmower in a maintenance state having an abutment part according to a fifth embodiment of the disclosure. Referring to FIG. 8, an abutment part 400 is disposed to abut an outer periphery of the blade disc 34. In the present embodiment, in the maintenance state of the lawnmower 10, the cutting blade 35 is retracted inside of the outer periphery of the blade disc 34 such that the abutment part 400 does not come in contact with the cutting blade 35. The cutting blade 35 may be retracted inside of the outer periphery of the blade disc 34, for example, by rotating around a pivot point. In the working state of the lawnmower 10, when the mowing motor 30 rotates the blade disc 34, the cutting blade 35 extends radially to the outside of the outer periphery of the blade disc 34 due to a centripetal force. The above configuration of the cutting blade 35 and the blade disc 34 is described as an example embodiment only. In other embodiments of the disclosure, other configurations of the cutting blade 35 and the blade disc 34 may be used for avoiding the abutment part 400 from coming in contact with the cutting blade 35 when the lawnmower 10 is in the maintenance state.

Next, a contact surface of the abutment part 300-1 and a contact surface of the blade disc 34 is described. Although the contact surface of the abutment part 300-1 is described, the same features of the contact surface may be utilized for the abutment part 300-2, the abutment part 300-3, and other abutment parts and is not intended to limit the disclosure.

Figure 9:
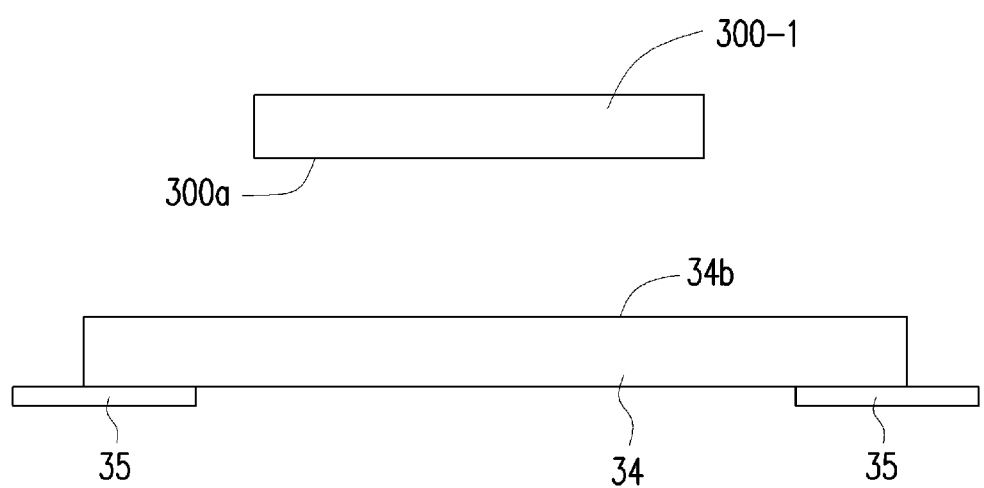
FIG. 9 is a schematic side view diagram illustrating a flat contact surface of an abutment part and a flat contact surface of a blade disc according to an embodiment of the disclosure.

FIG. 9 is a schematic side view diagram illustrating a flat contact surface of an abutment part and a flat contact surface of a blade disc according to an embodiment of the disclosure. Referring to FIG. 9, in the present embodiment, a contact surface 300a of the abutment part 300-1 abutting the blade disc 34 is a flat surface, and a contact surface 34b of the blade disc 34 abutting the abutment part 300-1 is a flat surface. In more detail, the flat contact surface 300a of the abutment part 300-1 abuts the flat contact surface 34b of the blade disc 34. In this way, the blade disc 34 may be fixed with the abutment part 300-1 due to pressure and friction generated by the blade disc 34 abutting with the abutment part 300-1, without requiring a complex structure.

Figure 10A:
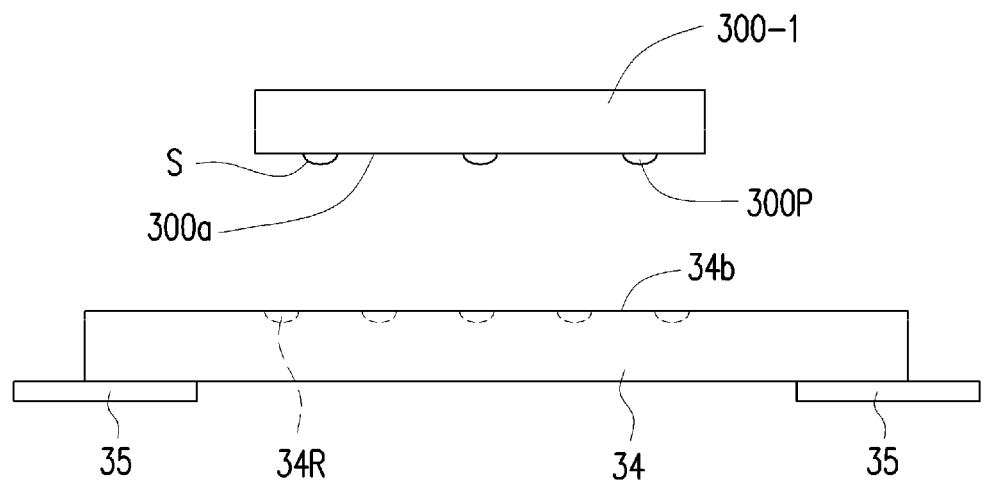
FIG. 10A is a schematic side view diagram illustrating a contact surface of an abutment part including protrusions and a contact surface of a blade disc including recesses according to an embodiment of the disclosure.
Figure 10B:
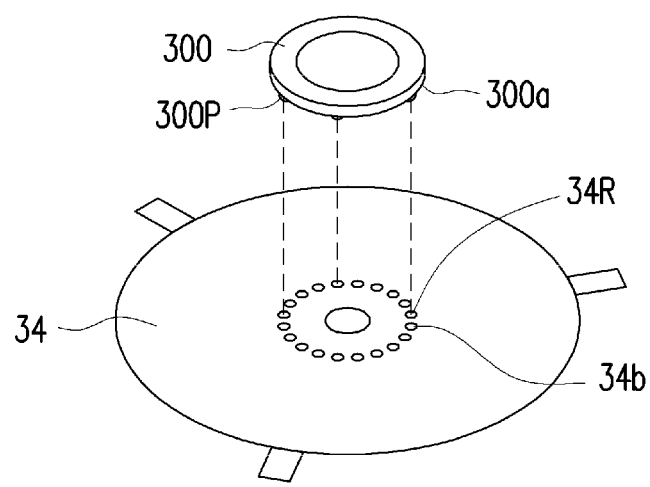
FIG. 10B is a schematic perspective view diagram illustrating a contact surface of an abutment part including protrusions and a contact surface of a blade disc including recesses according to an embodiment of the disclosure.

FIG. 10A is a schematic side view diagram illustrating a contact surface of an abutment part including protrusions and a contact surface of a blade disc including recesses according to an embodiment of the disclosure. FIG. 10B is a schematic perspective view diagram illustrating a contact surface of an abutment part including protrusions and a contact surface of a blade disc including recesses according to an embodiment of the disclosure. Referring to FIGS. 10A and 10B, wherein a contact surface 300a of the abutment part 300-1 includes a protrusion 300P, and a contact surface 34b of the blade disc 34 includes a recess 34R adapted to fit with the protrusion 300P. In this way, the blade disc 34 may be fixed with the housing 12 without requiring a large amount of pressure and/or friction to abut the blade disc 34 with the abutment part 300-1. In more detail, the contact surface 300a of the abutment part 300-1 may include a plurality of protrusions 300P, and the contact surface 34b of the blade disc 34 may include a plurality of recesses 34R. As shown in FIG. 10A and FIG. 10B, an interval separating the plurality of the protrusions 300P is greater than an interval separating the plurality of the recesses 34R. In this way, a quantity of the protrusions may be kept to a minimum. In addition, it may be understood that the recess 34R may be a recess or a through hole and the type of recess is not intended to limit the disclosure as long as the protrusion 300P is adapted to be fitted with the recess 34R to substantially restrict the blade disc 34 from rotating around the axis of the output shaft 32. The protrusion 300P includes a tilted surface S tilted with respect to a thickness direction of the blade disc 34. In this way, when the position of the blade disc 34 is changed vertically with respect to the lower casing 45 using the position adjustment mechanism 44, the protrusion 300P and the recess 34R may easily fit together, since the tilted surface S may guide the protrusion 300P into the recess 34R.

The above FIG. 10A and FIG. 10B have been described with the protrusions being provided on the abutment part 300-1 and the recesses provided on the blade disc 34. However, in other embodiments of the disclosure, the protrusions may be provided on the blade disc 34 and the recesses provided on the abutment part 300-1.

Figure 11:
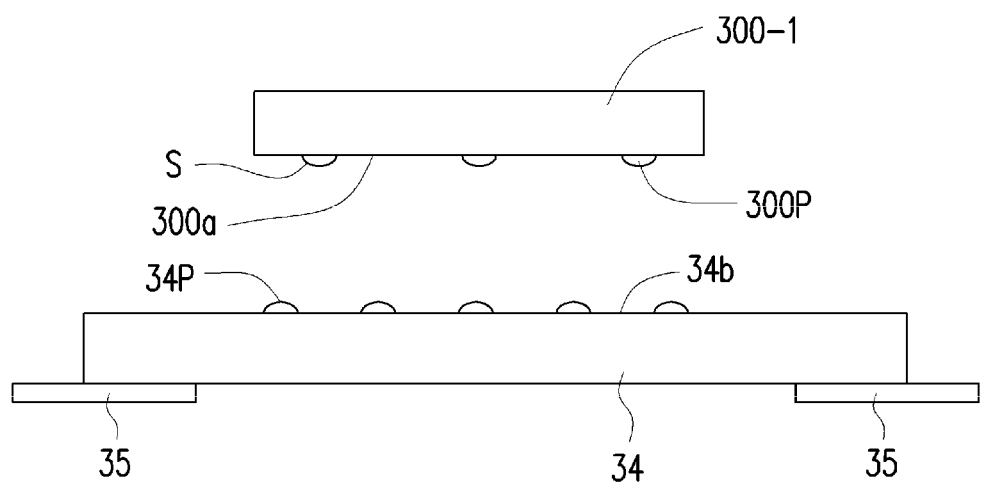
FIG. 11 is a schematic diagram illustrating a protrusion fitted with another protrusion according to an embodiment of the disclosure.

FIG. 11 is a schematic diagram illustrating a protrusion fitted with another protrusion according to an embodiment of the disclosure. Referring to FIG. 11, the contact surface 300a of the abutment part 300-1 includes the protrusion 300P, and the contact surface 34b of the blade disc 34 includes the protrusion 34P adapted to fit with the protrusion 300P. In other words, the protrusions 34P are adapted to fit between the protrusions 300P, and the protrusions 300P are adapted to fit between the protrusions 34P. In more detail, the contact surface 300a of the abutment part 300-1 may include a plurality of protrusions 300P, and the contact surface 34b of the blade disc 34 may include a plurality of protrusions 34P. Accordingly, the blade disc 34 may be fixed with the housing 12 without requiring a large amount of pressure and/or friction to abut the blade disc 34 with the abutment part 300-1. In this way, the protrusion 300P may be fitted with the protrusion 34P to substantially restrict the blade disc 34 from rotating around the axis of the output shaft 32.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A work vehicle, comprising:
a housing;
a first motor having an output shaft;
a working part comprising a member coupled to the output shaft;
a position adjustment mechanism, comprising a second motor, configured to change a position of the working part with respect to the housing;
an abutment part, comprising a surface, disposed on the housing,
wherein the position adjustment mechanism is configured to change the position of the working part such that the abutment part abuts the working part when the working part arrives at a position closest to the housing.

2. The work vehicle according to claim 1, wherein the work vehicle is an autonomous work vehicle comprising a processor, and the processor is configured to abut the working part with the abutment part after work is completed.

3. The work vehicle according to claim 2, wherein the work vehicle is a lawnmower, and the member coupled to the output shaft is a blade disc having a cutting blade, and the blade disc abuts with the abutment part.

4. The work vehicle according to claim 3, wherein the cutting blade is disposed at a one side of the housing, and the position adjustment mechanism is an adjustment mechanism for adjusting a height position of the working part.

5. The work vehicle according to claim 3, wherein the abutment part is disposed radially of the output shaft, and the abutment part is disposed only at one portion of an imaginary perimeter radial to the output shaft.

6. The work vehicle according to claim 3, wherein the abutment part is disposed around an imaginary perimeter radial to the output shaft.

7. The work vehicle according to claim 6, wherein the abutment part is disposed between an axis of the blade disc and the cutting blade disposed at an outer periphery of the blade disc.

8. The work vehicle according to claim 3, wherein a surface of the abutment part abutting the blade disc is a flat surface, and a surface of the blade disc abutting the abutment part is a flat surface.

9. The work vehicle according to claim 3, wherein a surface of the abutment part includes a protrusion, and a surface of the blade disc includes a recess adapted to fit with the protrusion.

10. The work vehicle according to claim 3, wherein a surface of the blade disc includes a protrusion, and a surface of the abutment part includes a recess adapted to with the protrusion.

11. The work vehicle according to claim 9, wherein an interval separating a plurality of the protrusions is greater than an interval separating a plurality of the recesses.

12. The work vehicle according to claim 10, wherein an interval separating a plurality of the protrusions is greater than an interval separating a plurality of the recesses.

13. The work vehicle according to claim 11, wherein the protrusion includes a tilted surface tilted with respect to a thickness direction of the blade disc.

14. The work vehicle according to claim 12, wherein the protrusion includes a surface tilted with respect to a thickness direction of the blade disc.

15. The work vehicle according to claim 3, wherein a surface of the abutment part abutting the blade disc includes a protrusion, and a surface of the blade disc abutting the abutment part includes a protrusion.

16. The work vehicle according to claim 6, wherein the abutment part is a ring disposed around an imaginary perimeter radial to the output shaft.

17. The work vehicle according to claim 6, wherein the abutment part is disposed only at three portions of an imaginary perimeter radial to the output shaft.

18. The work vehicle according to claim 3, wherein the abutment part comprises a spring.

* * * * *